US008257473B2

(12) United States Patent  
McCombs et al.

(10) Patent No.: US 8,257,473 B2  
(45) Date of Patent: Sep. 4, 2012

(54) SIEVE BED

(75) Inventors: Norman R. McCombs, Tonawanda, NY (US); Robert Bosinski, West Seneca, NY (US)

(73) Assignee: AirSep Corporation, Buffalo, NY (US)

( * ) Notice: Subject to any disclaimer, the term of this patent is extended or adjusted under 35 U.S.C. 154(b) by 0 days.

(21) Appl. No.: 13/177,679

(22) Filed: Jul. 7, 2011

(65) Prior Publication Data

US 2012/0006199 A1   Jan. 12, 2012

Related U.S. Application Data

(60) Provisional application No. 61/362,400, filed on Jul. 8, 2010.

(51) Int. Cl.  
*B01D 53/04* (2006.01)

(52) U.S. Cl. ............................ 96/149; 96/139; 96/152

(58) Field of Classification Search ................ 95/90, 96; 96/139, 152  
See application file for complete search history.

(56) References Cited

U.S. PATENT DOCUMENTS

| | | | | |
|---|---|---|---|---|
| 2,063,990 A * | 12/1936 | Dym | ............................... | 96/139 |
| 2,400,076 A * | 5/1946 | Dauster | .......................... | 96/139 |
| 2,400,180 A * | 5/1946 | Emerson | ......................... | 96/139 |
| 2,517,525 A * | 8/1950 | Cummings | .................... | 422/637 |
| 2,557,557 A * | 6/1951 | Newcum | ....................... | 210/282 |
| 2,790,512 A * | 4/1957 | Dow | ............................... | 95/117 |
| 3,067,560 A * | 12/1962 | Parker | ............................ | 96/152 |
| 4,374,095 A * | 2/1983 | Legg et al. | .................... | 422/218 |
| 4,541,851 A * | 9/1985 | Bosquain et al. | ............... | 96/126 |
| 4,946,485 A * | 8/1990 | Larsson | .......................... | 96/152 |
| 5,599,384 A * | 2/1997 | Yoshida et al. | ................. | 96/143 |
| 5,716,427 A * | 2/1998 | Andreani et al. | ................. | 95/90 |
| 5,779,773 A * | 7/1998 | Cam et al. | ....................... | 96/152 |
| 5,814,129 A * | 9/1998 | Tentarelli | ......................... | 95/90 |
| 5,827,485 A * | 10/1998 | Libal et al. | .................... | 422/179 |
| 5,851,269 A * | 12/1998 | Strope | ............................ | 96/144 |
| 5,893,945 A * | 4/1999 | Hunsinger et al. | .............. | 96/135 |
| 5,922,178 A * | 7/1999 | Isenberg | ........................ | 204/265 |
| 6,059,863 A * | 5/2000 | Monereau et al. | .............. | 96/152 |
| 6,086,659 A * | 7/2000 | Tentarelli | ........................ | 96/131 |
| 6,638,348 B2 * | 10/2003 | Kuriiwa et al. | ................. | 96/146 |
| 6,770,120 B2 * | 8/2004 | Neu et al. | .......................... | 95/96 |
| 6,866,700 B2 * | 3/2005 | Amann | ........................... | 95/273 |
| 6,874,483 B2 * | 4/2005 | Zuchara | ........................ | 123/519 |
| 8,101,133 B2 * | 1/2012 | Ackley et al. | .................. | 422/218 |
| 8,114,194 B2 * | 2/2012 | Haggerty | .......................... | 95/90 |

* cited by examiner

*Primary Examiner* — Duane Smith  
*Assistant Examiner* — Christopher P Jones  
(74) *Attorney, Agent, or Firm* — Ronald S. Kareken; Hiscock & Barclay, LLP

(57) ABSTRACT

A sieve bed including an inlet end, an outlet end, a retainer disposed toward the inlet end and including an interior portion, an exterior portion, a plurality of openings disposed toward the exterior portion, and a passage disposed toward the interior portion, an inlet cap and an inlet port configured to receive a feed stream, wherein the inlet cap includes at least a portion spaced from the retainer thereby defining an inlet chamber in fluid communication with the inlet port and the plurality of openings, an outlet lid disposed toward the outlet end, an exterior wall extending from the inlet cap to the outlet lid, an intermediate wall spaced from the exterior wall and extending from the retainer toward and terminating short of the outlet lid and an interior wall spaced from the intermediate wall and extending from the retainer proximate the passage to at least the outlet lid.

20 Claims, 3 Drawing Sheets

SIEVE BED

CROSS-REFERENCE TO RELATED APPLICATIONS

This application claims the benefit of U.S. Provisional Patent Application Ser. No. 61/362,400, filed on Jul. 8, 2010, which is fully incorporated herein by reference.

TECHNICAL FIELD

The present invention relates to oxygen concentrators and, more particularly, to improved adsorber and sieve bed components of an oxygen concentrator.

BACKGROUND INFORMATION

The general type and operating principles of PSA, or pressure swing adsorption, apparatus with which this invention is concerned are described in U.S. Pat. Nos. 3,564,816; 3,636,679; 3,717,974; 4,802,899; 5,531,807 and 5,871,564, the entire disclosures of which are incorporated by reference herein. For example, a pressure swing adsorption apparatus may include one or more adsorbers, each having a fixed sieve bed of adsorbent material to fractionate at least one constituent gas from a gaseous mixture by adsorption into the bed, when the gaseous mixture from a feed stream is sequentially directed through the adsorbers in a co-current direction. While one adsorber performs adsorption, another adsorber is simultaneously purged of its adsorbed constituent gas by part of the product gas that is withdrawn from the first or producing adsorber and directed through the other adsorber in a counter-current direction. Once the other adsorber is purged, the feed stream at a preset time is then directed to the other adsorber in the co-current direction, so that the other adsorber performs adsorption. The first adsorber then is purged either simultaneously, or in another timed sequence if there are more than two adsorbers, all of which will be understood from a reading of the above described patents.

When, for example, such an oxygen concentrator apparatus employing pressure swing adsorption is used to produce a high concentration of oxygen from ambient air for use in various applications, whether medical, industrial or commercial, air which enters the apparatus typically contains about 78% nitrogen, 21% oxygen, 0.9% argon, and a variable amount of water vapor. Principally, most of the nitrogen is removed by the apparatus to produce a gas product, which for medical purposes, for example, typically may contain at least about 80% oxygen.

As oxygen concentrator apparatus, particularly for medical uses, have become more compact and portable, and their users more mobile, we have found that the product gas oxygen concentration level is adversely affected by the humidity, moisture and/or relative water vapor concentration in the ambient air feed stream and particularly by operation, whether continuous or cycling, of the oxygen concentrator in close time proximity in high humidity and low humidity environments. Accordingly, there is a need for an improved oxygen concentrator apparatus configured to mitigate the adverse environmental effects on product gas oxygen concentration levels while maintaining a high level of portability.

BRIEF DESCRIPTION OF THE DRAWINGS

The present invention is disclosed with reference to the accompanying drawings, wherein.

Figure 1:
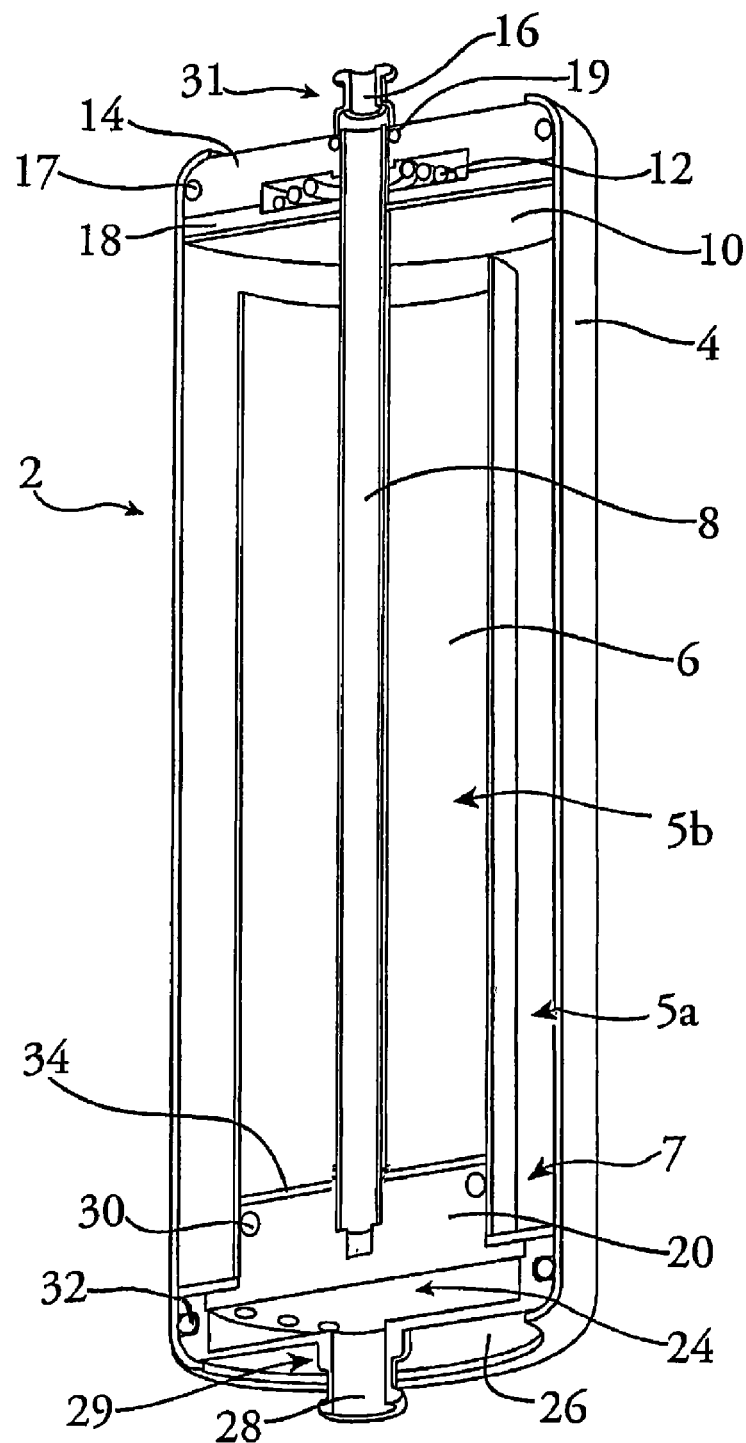
FIG. 1 is a perspective cross-sectional view of a sieve bed according to one embodiment of the present invention.

It will be appreciated that for purposes of clarity and where deemed appropriate, reference numerals have been repeated in the figures to indicate corresponding features.

DETAILED DESCRIPTION

Turning now to the drawings and in accordance with the present invention, there is shown a preferred embodiment, generally indicated as 2, of a sieve bed apparatus of an oxygen concentrator used for fractionating at least one component, namely nitrogen, from a gaseous mixture feed stream, generally but not necessarily ambient air, such as by pressure swing adsorption, for example, to produce a product gas that can be delivered by the oxygen concentrator at specific and variable intervals upon demand by a user. The present invention is not concerned with any particular pressure swing adsorption (PSA) cycle per se. The invention can be used with virtually any such cycle, and has the capacity to operate many different multi-bed or single bed cycles.

Referring specifically to FIG. 1, a cross sectional view of a preferred embodiment of a sieve bed 2 is shown as including an inlet port 28 configured to receive a feed stream, generally of ambient air, as facilitated by an intake system of the oxygen concentrator apparatus (not shown). Referring to FIGS. 1-4, the inlet port 28 is attached to, or part of, the inlet cap 26 which, along with the retainer 20, form an inlet chamber 24 optionally by positioning of the retainer 20 at a lip portion 25 of the inlet cap 26 (see FIG. 4). As the feed stream is collected in the chamber 24, it is drawn through a plurality of openings 40 in the retainer 20 which provide even distribution of the feed stream across the sieve bed as it travels along a flow path initially between exterior wall 4 and intermediate wall 6 and continuing between intermediate wall 6 and interior wall 8. The walls 4, 6, and 8 may be annular structures and concentrically disposed. The flow path described above is made possible, at least in part, because intermediate wall 6 is of a length such as to terminate short of the outlet lid 10. The outlet lid 10, together with the inlet lid 34, inlet cap 26, and the retainer 20, generally define a bed area 5a and 5b having an effective length approaching twice the length of the exterior wall 4. While the preferred embodiment shown includes only one intermediate wall 6, any number of intermediate walls may be provided. Further, while the preferred embodiment shown includes walls 4, 6, and 8 of annular structure, other embodiments including shapes such as square, oval, or hexagonal, for example, could be used in accordance with the teaching of the invention.

Upon packing/assembly, the entire space of the bed area 5 is filled with any suitable adsorbent material, such as silica gel, molecular sieves of various sorts, carbon, synthetic zeolite, or other known adsorber material having equivalent properties. Accordingly, as the feed stream travels along the flow path, the gas interacts with the adsorbent material to remove constituents, such as nitrogen, from the feed stream, resulting in a product gas having an increased concentration of oxygen relative to that of the ambient air.

However, we have found that a mass transfer zone 7, or water zone, results substantially in the entry portion of the bed area 5 due, at least in part, to the adsorbent material interacting with liquid vapor, or other water molecules, present in the feed stream. The extent of the mass transfer zone 7 is also influenced by the relatively large weight and size of water molecules present in the feed stream as well as temperature of the feed stream and pressure in the bed area 5, as discussed in more detail below. Accordingly, the mass transfer zone generally extends further along the length of the bed area 5 when the feed stream is warm ambient air of a high concentration of water vapor, such as in an environment of high humidity. As the mass transfer zone 7 extends further along the length of the bed area 5, the effect of the adsorbent material on removing constituents, such as nitrogen, from the feed stream is reduced.

Accordingly we have discovered that increased effective length of the bed area 5, as well as reduced diameter and cross sectional area, due to the placement of the intermediate wall 6, results in higher oxygen concentration product gas because of the increased interaction with the adsorbent material and reduced moisture migration along the flow path. We have further found that moisture migration has been reduced by placement of the inlet 28 and outlet 16 ports on opposing ends of the sieve bed 2 as made possible by the inventive configuration described in more detail below.

Referring again to FIGS. 1-4, as the feed stream travels along the flow path back toward the inlet end 29 of the sieve bed 2 it is forced past inlet lid 34 into an opening, aperture, or slotted passage 22 in the retainer 20 where it is received by interior wall 8. Interior wall 8 is optionally of analogous shape to walls 4 and 6 which, in the preferred embodiment, are all annular structures such as a hollow annular walls, tubes, or pipes, for example. In a preferred embodiment, the interior wall 8 is disposed in a recessed portion of the retainer 20 adjacent slotted passage 22 such that a space exists between the interior wall 8 and the retainer 20 for the gas to travel into and be received by the space formed by the interior wall 8. Once received by the space formed by the interior wall 8, the gas no longer has access to sieve material and is product gas having an increased concentration of oxygen relative to that of the ambient air. Accordingly, in the pressure swing absorption cycle described above, the product gas is forced to travel through the space formed by the interior wall 8, toward the outlet end 31 of the sieve bed 2, and to outlet port 16 to be selectively released to a user.

Figure 2:
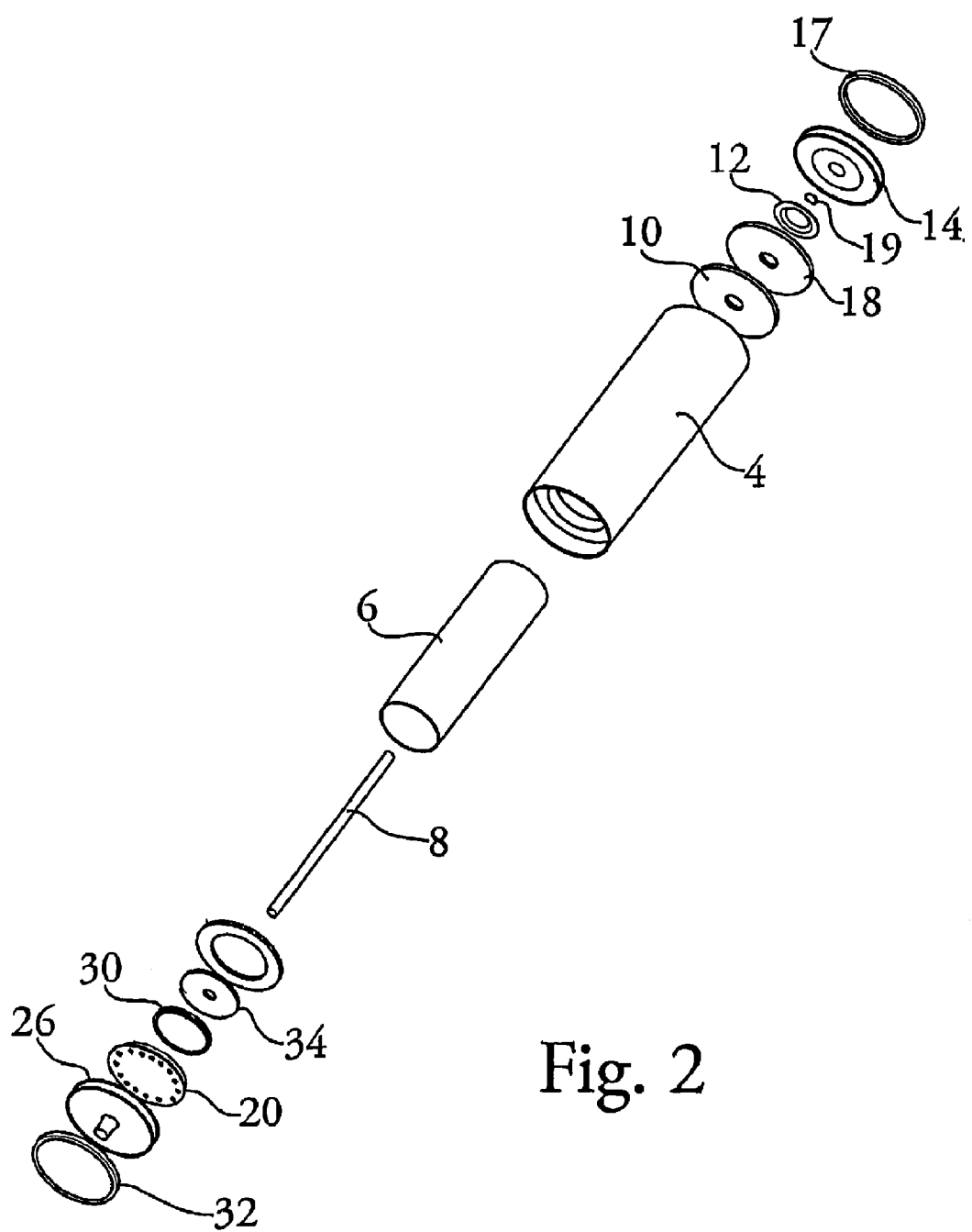
FIG. 2 is an exploded view of a sieve bed according to one embodiment of the present invention.
Figure 3:
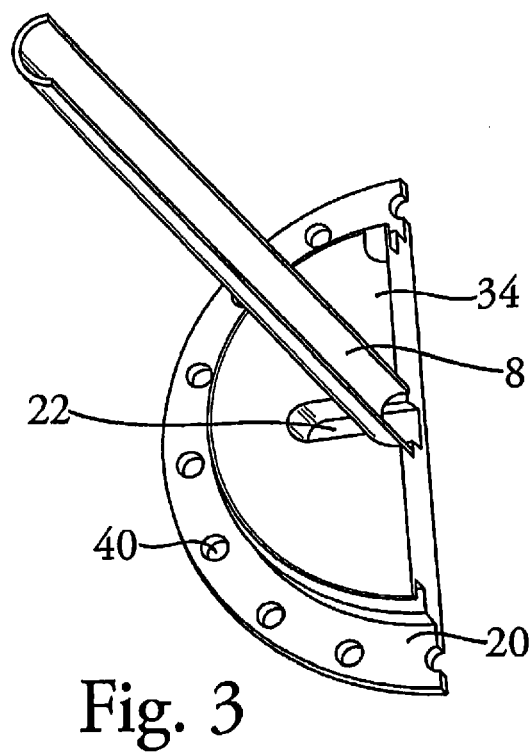
FIG. 3 is a perspective view of an interior conduit and a retainer of a sieve bed according to one embodiment of the present invention.
Figure 4:
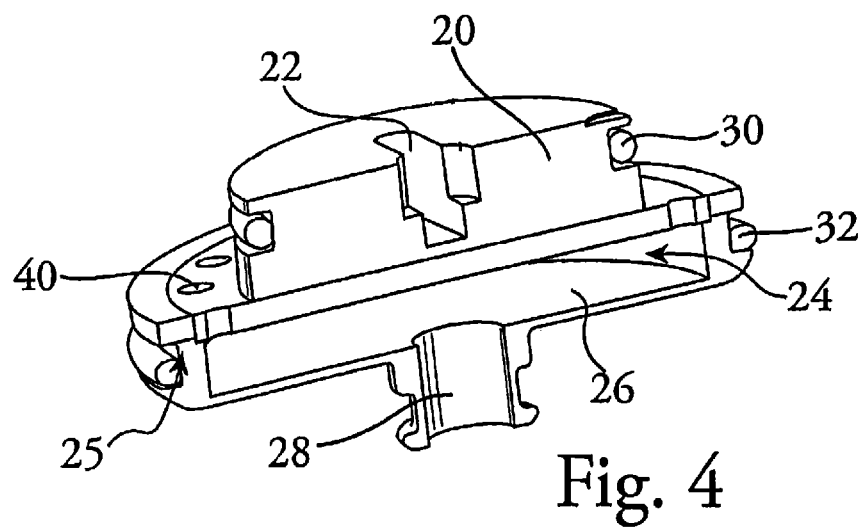
FIG. 4 is a perspective view of a retainer and an inlet cap of a sieve bed according to one embodiment of the present invention.

In order to advantageously maintain pressure and packed arrangement of the sieve material, conical spring 12 disposed between spring retainer 18 and outlet cap 14, as shown in FIGS. 1 and 2, is configured to extend, such as when settling of the sieve material occurs, by operatively moving spring retainer 18 and outlet lid 10 toward the inlet end 29 of the sieve bed 2. Accordingly, the spring retainer 18 and outlet lid 10 are configured to extend to the exterior wall 4 such that vertical movement along the exterior wall 4 by the spring retainer 18 and outlet lid 10 is possible, yet travel of molecular and/or gaseous material between the wall 4 and the perimeter of spring retainer 18 and outlet lid 10 is minimized. Accordingly, in the preferred embodiment shown, the sieve bed 2 is spring biased in order not to "fluidize" the sieve material in the depressurization or pressure equalization stages. To further maintain sufficient pressure in the bed area 5, several O-rings 32, 30, 17, and 19 are provided, as shown in FIGS. 1, 2, and 4, and disposed between exterior wall 4 and the inlet cap 26, intermediate wall 6 and retainer 20, exterior wall 4 and outlet cap 14, and interior wall 4 and outlet cap 14 respectively.

As can now be appreciated, the sieve bed 2 configuration shown in the preferred embodiment of the invention and described above provides for inlet 28 and outlet 16 ports disposed at opposing ends of the sieve bed 2, an arrangement taught away from by the prior art such as U.S. Pat. No. 4,378,982, the entire disclosure of which is incorporated by reference herein. As well as the advantages described above and utility in other portable concentrators, the sieve bed 2 configuration of the present invention can readily be substituted for sieve beds 30, 32 in the dual manifold oxygen concentrator component structure as disclosed in commonly assigned U.S. Published Patent Application. No. US2006/0117957, published Jun. 8, 2006 and entitled "Mini-portable Oxygen Concentrator," the entire disclosure of which is incorporated by reference herein and which oxygen concentrator is embodied in the FreeStyle™ Concentrator as sold by AirSep Corporation of Buffalo, N.Y. Accordingly, the highly effective sieve bed configuration of the present invention can be utilized in a compact and highly portable oxygen concentrator thereby maintaining the portability mobile users of oxygen concentrators desire while providing a product gas of a higher concentration of oxygen than could be accomplished using sieve beds of any known compact prior art devices.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A sieve bed for use in an oxygen concentrator system, comprising:
   an inlet end;
   an outlet end;
   a retainer disposed toward the inlet end and including an interior portion, an exterior portion, a plurality of openings disposed toward the exterior portion, and a passage disposed toward the interior portion;
   an inlet cap disposed proximate the retainer and an inlet port disposed proximate the inlet cap and configured to receive a feed stream, wherein the inlet cap includes at least a portion spaced from the retainer to thereby define an inlet chamber wherein the inlet chamber is in fluid communication with the inlet port and the plurality of openings;
   an outlet lid disposed toward the outlet end;
   an exterior wall extending at least from the inlet cap to at least the outlet lid;
   an intermediate wall spaced from the exterior wall and extending from about the retainer toward and terminating short of the outlet lid; and
   an interior wall spaced from the intermediate wall and extending at least from the retainer proximate the passage to at least the outlet lid.

2. The sieve bed of claim 1 wherein the exterior, intermediate, and interior walls are annular structures.

3. The sieve bed of claim 2 wherein the diameter of the intermediate wall is less than the diameter of the exterior wall and the diameter of the interior wall is less than the diameter of the intermediate wall.

4. The sieve bed of claim 1 wherein the retainer further includes at least one recessed portion disposed proximate the passage wherein the recessed portion is configured to receive at least a portion of the interior wall.

5. The sieve bed of claim 1 wherein each of the plurality of opening are evenly distributed.

6. The sieve bed of claim 1 further including:
a spring retainer disposed proximate the outlet lid and toward the outlet end;
a spring;
an outlet cap disposed proximate the spring retainer;
an outlet port disposed proximate the outlet cap and configured to communicate a product gas;
wherein the outlet cap includes at least a portion spaced from the spring retainer and configured to receive the spring; and
wherein the spring retainer and outlet lid are configured to be movable longitudinally with respect to the exterior wall.

7. The sieve bed of claim 1 further including an inlet lid disposed proximate the interior portion of the retainer.

8. The sieve bed of claim 1 wherein the intermediate wall is configured to extend from a portion of the exterior portion of the retainer toward the interior portion from the plurality of openings.

9. The sieve bed of claim 1 further including a first O-ring, a second O-ring, and a third O-ring disposed proximate the exterior wall and the inlet cap, the intermediate wall and the retainer, and the exterior wall and the outlet cap, respectively.

10. A sieve bed, comprising:
an outlet lid;
an outlet port;
a retainer including an interior portion, an exterior portion, and a plurality of openings disposed toward the exterior portion;
an annular exterior wall defining a bed area in fluid communication with the plurality of openings;
an annular interior wall including an interior portion in fluid communication with the outlet port;
an first set of annular intermediate walls and a second set of annular intermediate walls wherein each of the first set of annular intermediate walls extends from the retainer toward and short of the outlet lid and each of the second set of annular intermediate walls extends from the outlet lid toward and short of the retainer;
wherein each of the first set of annular intermediate walls and each of the second set of annular intermediate walls are alternately disposed and spaced apart; and
wherein the retainer includes a passage proximate the interior wall and extending outwardly beyond the intersection of the interior wall and the retainer.

11. The sieve bed of claim 10 wherein the passage does not extend beyond the intersection of the annular intermediate wall immediately proximate the interior wall and the retainer.

12. The sieve bed of claim 10 wherein each of the exterior wall, intermediate walls, and interior wall is an annular structure.

13. The sieve bed of claim 10 wherein the interior wall intersects the retainer at about the center of the interior portion of the retainer.

14. The sieve bed of claim 10 wherein the retainer further includes at least one recessed portion disposed proximate the passage wherein the recessed portion is configured to receive at least a portion of the interior wall.

15. The sieve bed of claim 10 wherein the annular intermediate wall immediately proximate the interior wall is one of the first set of annular intermediate walls.

16. The sieve bed of claim 10 wherein the annular intermediate wall immediately proximate the exterior wall is one of the first set of annular intermediate walls and wherein the annular intermediate wall immediately proximate the exterior wall is configured to extend from a portion of the exterior portion of the retainer inward of the plurality of openings.

17. The sieve bed of claim 10 further including an inlet cap disposed proximate the retainer and an inlet port disposed proximate the inlet cap, wherein the inlet cap includes at least a portion spaced from the retainer to thereby define an inlet chamber wherein the inlet chamber is in fluid communication with the inlet port and the plurality of openings.

18. A sieve bed apparatus, comprising:
an outlet lid;
a retainer including an interior portion, an exterior portion, a plurality of openings disposed toward the exterior portion, and a passage disposed toward the interior portion;
an exterior wall extending at least from the exterior portion of the retainer to at least the outlet lid;
an intermediate wall spaced from the exterior wall and extending from about the retainer toward and terminating short of the outlet lid; and
an interior wall spaced from the intermediate wall and extending from the retainer proximate the passage and through the outlet lid; and
a bed area defined at least by the outlet lid and the retainer and having an effective length greater than the length of the exterior wall.

19. The sieve bed of claim 18 further including an inlet cap disposed proximate the retainer and an inlet port disposed proximate the inlet cap, wherein the inlet cap includes at least a portion spaced from the retainer to thereby define an inlet chamber wherein the inlet chamber is in fluid communication with the inlet port and the plurality of openings.

20. The sieve bed of claim 18 further including:
a spring retainer disposed proximate the outlet lid;
a conical spring;
an outlet port disposed proximate the outlet cap and in communication with the interior wall;
an outlet cap disposed proximate the spring retainer and attached to the outlet port;
wherein the outlet cap includes at least a portion spaced from the spring retainer and configured to receive the conical spring; and
wherein at least the spring retainer and outlet lid are configured to be movable axially with respect to the exterior wall.

* * * * *